United States Patent

[11] 3,592,066

| [72] | Inventor | Gerald B. Speen<br>Northridge, Calif. |
|------|----------|--------------------------------|
| [21] | Appl. No. | 601,016 |
| [22] | Filed | Dec. 12, 1966 |
| [45] | Patented | July 13, 1971 |
| [73] | Assignee | Conductron Corporation<br>Northridge, Calif. |

[54] TWO-AXIS RATE GYRO
6 Claims, 1 Drawing Fig.

[52] U.S. Cl. .................................................. 74/5.5,
74/5.6, 308/7, 308/122
[51] Int. Cl. ....................................................... G01c 19/04
[50] Field of Search ........................................... 74/5, 5.22,
5.6, 5.7, 5.5; 308/7, 122, 72

[56] References Cited
UNITED STATES PATENTS

| 2,517,612 | 8/1950 | Varian | 74/5.34 |
| 2,592,417 | 4/1952 | Hale | 74/5.6 X |
| 3,252,339 | 5/1966 | Xen-ti Huang | 74/5.6 |
| 3,254,537 | 6/1966 | Elwell et al. | 74/5.6 |
| 3,267,748 | 8/1966 | Conklin, Jr. | 74/5 X |
| 3,311,326 | 3/1967 | Scotto et al. | 74/5.7 X |
| 3,355,787 | 12/1967 | Sullivan, Jr. | 308/72 X |
| 3,358,514 | 12/1967 | Hauf et al. | 74/5.7 |

Primary Examiner—Robert A. O'Leary
Assistant Examiner—William E. Wayner
Attorney—Kingslord, Rogers, Ezell, Eilers & Robbins ABSTRACT: This invention relates to a control device and more particularly to a two-axis rate gyro in which the rotatable mass of the gyro is contained within a casing having a peripheral partially spherical exterior wall with opposed flat ends perpendicular to the spin axis of the rotating mass. The casing is in turn mounted within the exterior frame, or housing member, by means of elastomeric material which supports the casing and connects the casing to the frame. The configuration of the elastomeric mass is such that it supports the casing without the need of additional gimbles or bearings, and allows movement of the casing about two axes. Means are provided for the detection of such movement about the two axes for control purposes.

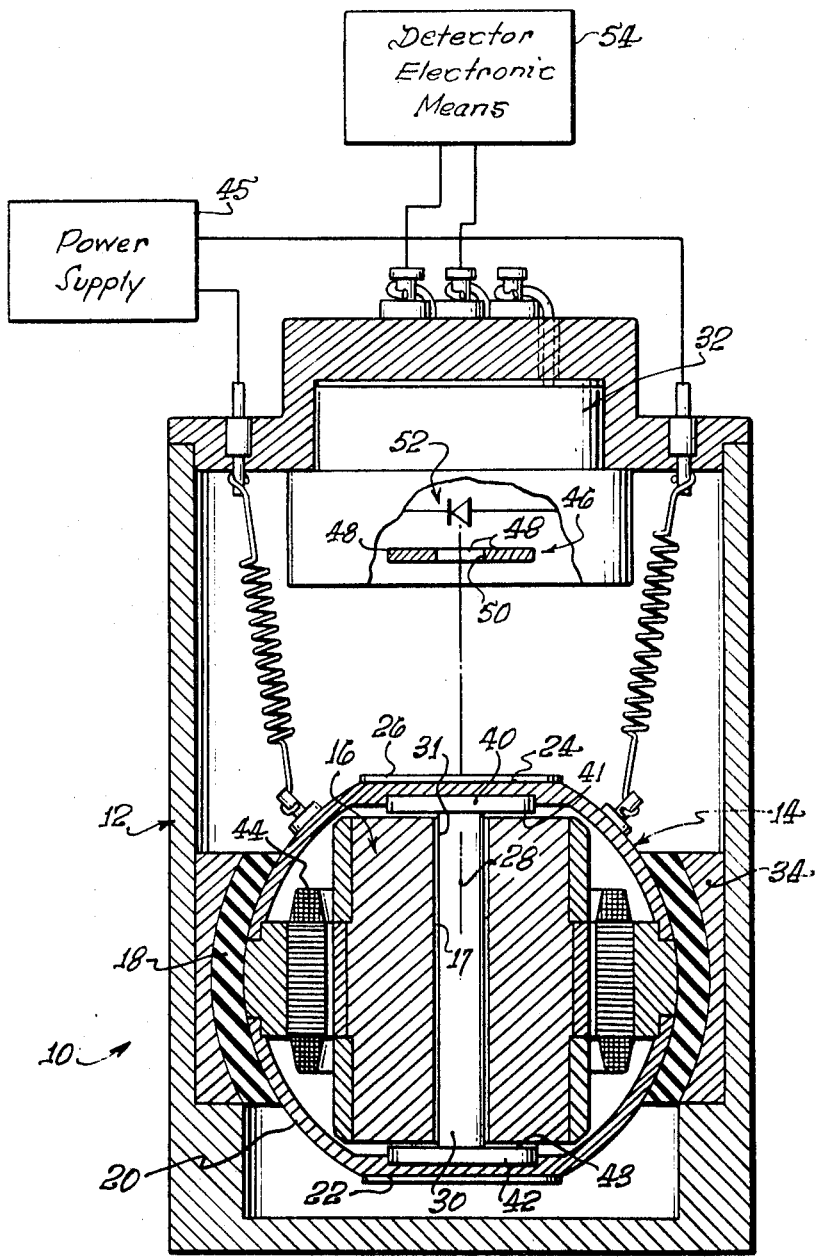

TWO-AXIS RATE GYRO

It is well known that gyros such as rate gyros are commonly employed in control applications such as in the control systems for airplanes and missiles. In such applications, size, weight, reliability, ruggedness and accuracy are the main performance criteria. In general, such devices have employed a multiplicity of moving parts. For example, typically, these devices include a rotating mass which is mounted to rotate about one axis and supporting members which permit rotation of the rotating mass about at least one axis. These support members involve moving parts, friction and wear points. The composite result of all this movement presents difficult material, tolerance and manufacturing requirements as well as auxiliary component requirements if the above performance criteria is to be met.

The present invention takes the approach that moving parts should be minimized as much as is possible and that an attempt should be made to make the gyro a solid state device. Consistent with this approach, the invented gyro employs only one moving part and this part is supported by an appropriate bearing. While there are other parts which experience relative movement, these parts do not move over one another with friction losses. The phrase "moving parts" employed in this specification contemplates the movement of parts relative to one another with the usual attendant friction losses either due to rotational or sliding surface forces or other friction forces. Briefly, the general structure of the invention comprises a casing means, a rotatable mass mounted on said casing means to rotate about a spin-axis, a means for rotating the mass, a frame means for supporting the casing, and a resilient means surrounding at least a portion of the casing and coupled to the frame to mount said casing to move freely about the two axes normal to the spin-axis.

The above-generalized structure can be fully understood by reference to an embodiment as shown in the sole drawing which is a simplified cross-sectional view of one embodiment of the invention.

Referring to the drawing, the invented control device 10 which in this specific embodiment is a rate gyro includes a frame means or housing 12 in the form of a cylindrical can for mounting casing means 14. The casing 14 supports a rotatable mass 16 and is in turn coupled to and supported by frame 12 by resilient means 18. The casing 14 is preferably a hollow three-dimensional body having a substantially spherical shape, that is, having at least a spherical portion 20 around a substantial portion of its periphery. The spherical portion 20 is bounded by a pair of flat surfaces 22 and 24. The flat surface 24 has a mirror surface 26 thereon which surface is perpendicular to the spin-axis 28 about which shaft 30 is mounted. In addition, the mirror surface 26 is mounted in cooperative relationship to a transducer means 32 which will be described later in the specification.

The spherical portion 20 of casing 14 matingly engages the resilient means 18 which in turn is fixed to the frame 12 by intermediate support member 34. The resilient means 18 is preferably an elastomeric material such as any of the various class of elastomers including natural rubber, silicon rubbers, butadiene-styrene, acrylonitride, cholorprene, butyl, urethane, polysulphide, viton, fluanated acrylic, and others. Elastomer should have forced deflection properties which experience little change with changing temperature. It should also have a relatively low strain sensitivity. The phenomena of strain sensitivity is effectively a description of a nonlinear nature of the elastic stress-strain property. By careful selection of the elastomer cross section and mounting geometry, the nonlinearity of the elastomer can be minimized and an essentially linear support media fabricated. The recovery time of the elastomer must also be tailored to meet the sensitivity and particular application of the instrument. An elastomer which generally meets these requirements is an elastomer (e.g., natural rubber or silicon rubber material) with some fibrous material that is (1) randomly oriented; and (2) has a springlike property. This could be a "steel wool"-type material made of such material as beryllium-copper or bronze or glass fibers. This spring material would provide the spring restraint while the elastomer would act as a damping medium. Of course, a plain elastomer such as silicone or neoprene could be used where less accurate performance is required. The resilient means 18 may be attached to the spherical structure 14 and to the intermediate support member 34 by a variety of adhesives or the resilient means 18 may be directly molded into the space between the two parts while they are held in a fixture that properly positions them and facilitates such molding. The frame 12 may be made in two or more pieces to facilitate the various manufacturing procedures.

The shaft 30 is rigidly mounted in the casing 14. The rotatable means 16 surrounds this shaft 30 such that the inner cylindrical surface 17 of rotatable means 16 and the outer cylindrical surface 31 of shaft 30 are separated by a small gap (e.g., 0.0001 inch radial clearance). This forms a self-acting gas lubricated journal bearing to provide radial support for the rotor. The inner surfaces 41 and 43 of the flanges 40 and 42 rigidly fixed to the shaft 30 oppose similar flat surfaces on the upper and lower faces of the rotor to form a pair of self-acting gas lubricated thrust bearings to provide axial support for the rotor. Grooves or recesses may be provided on the thrust bearing surfaces as necessary to provide sufficient load carrying capacity. Thus, the rotor is entirely supported on a set of gas films when it is rotated. Typically, the rotatable mass 16 is the rotor of a motor which includes a means 44 for rotating the rotatable mass 16, which in this embodiment is the stator of the motor mounted within the casing 14. The motor employed in this embodiment may be a motor energized by the power supply 45 which may take the form of any of the well-known motor power supplies.

The rotatable mass 16 may be supported by any of the well-known bearing arrangements, but it is preferred that axial and radial support be provided by a self-acting gas bearing. Such a bearing requires no additional lubrication, introduces no vibrations, avoids friction and wear problems, and has extremely long lifetime. On the other hand, conventional bearings such as ball bearings might be used to lower cost if lower performance and shorter lifetime may be tolerated.

Located adjacent the reflecting surface 26 is transducer 32 which is preferably an optical pickoff such as is disclosed in U.S. Pat. application Ser. No. 448,012, filed Apr. 14, 1965, and assigned to the same assignee of this patent application. Briefly, such an optical pickoff comprises a detection means 46 which is a grouping of four photocells in a cruciform arrangement with an opening 50 at the center and a radiant energy means 52 such as a laser or other solid-state light emitting device located adjacent detection means 46 and transmitting radiant energy through opening 50 to reflecting surface 26. The surface of detection means 46 is located along a plane which is parallel to the reflecting surface 26. With the surface of the detection means 46 and the reflecting surface 26 parallel all radiant energy transmitted through opening 50 to the reflecting surface 26 and returned to detection means 46 will be equally distributed over photocells 48. When the reflecting surface becomes inclined, certain of the photocells will receive more radiant energy than other photocells and consequently, a signal will be provided by these photocells which is proportional to the radiant energy received and in turn, proportional to the inclination of the reflecting surface 26. This type of optical pickoff resolves the inclination of the reflecting surface 26 along two axes. The output of the detector means is connected to detector electronic means 54 which in turn processes the signal and employs it for control or computation purposes. It is understood that magnitude, slope, frequency or pulse detection techniques may be employed. In addition to detector electronic means 54, transducer 32 includes a power supply. The operation of such an optical pickoff is explained in greater detail in the above-mentioned patent application. Other suitable pickoff techniques include capacitive, electromagnetic (E-pickoff) and electromechanical.

In operation, the gyro 10 is mounted in an airplane, missile or other body subject to rotational motion. The stator 44 is energized which in turn rotates rotatable mass 16 about its spin-axis 28. This spinning of rotatable mass 16 creates an air bearing that radially and axially supports rotatable mass 16 on shaft 30. Simultaneously, optical pickoff 32 is energized so that radiant energy means 52 emits light which passes through the opening 50 to reflecting surface 26 and is returned to detection means 46. In the event that surface 26 remains parallel to the surface of detection means 46, there will be no change in the light falling upon the various photocells and consequently, these photocells which are initially adjusted to present a zero output when the respective surfaces are parallel will provide no output signal. Eventually, the gyro 10 will be subjected to various rotations so that the casing 14 is angularly displaced perpendicular to the spin-axis 28. Rotations about the spin-axis 28 will not be sensed. The two axes perpendicular to the spin axis are the input and output axes which are interchangeable. The rotation of the casing about any axis perpendicular to spin-axis 28 will result in an angular movement of the casing about the axis perpendicular to both the input axis and the spin-axis (gyro precession). The resilient ring means 18 permits such movement but restrains it by its springlike properties. The rotation of the casing 14 will be sensed by optical pickoff 32 and resolves it into movement about two reference axes perpendicular to the spin-axis. This is accomplished by the reflecting surface 26 altering the distribution of light over the photocells 48 so that, dependent upon the direction of the movement, certain of the photocells will receive increasing or decreasing amounts of light. The change or rate of change of the light falling upon the photocells 48 may be detected by detector electronic means 54 which may in turn employ the signals to perform a computation or a control function. The resilient suspension can be designed such that the output signal from the photocells is directly proportional to the input rate and the magnitude of the signal in each reference axis defines the orientation of the input rotation rate with respect to the reference axes defined by the photocell structure. When the rotations on the gyro are removed, the spin-axis will assume its normal position being returned by the elastomeric spring suspension and the reflecting surface 26 will return to its position parallel to the surface of detection means 46.

From the above description it can be seen that a control device, and particularly a two-axis rate gyro, has been provided which is very rugged, tolerant to severe environmental conditions, small and light in weight. It has little, if any, mechanical wear and utilizes a minimum of power. The performance provided by this gyro is superior to the average rate gyro at a cost that is substantially less due to the simplicity of its design.

There are, of course, many other variants of the above-described invention which may readily be conceived by ordinary skill in the art. For example, a three-axis device may be provided by combining two of the above-described control devices. In addition, damping may be provided either by building it into the elastomeric material, that is, selecting and shaping the materials, using magnetic damping in the casing or by using fluids.

What I claim is:

1. A control device comprising:
a casing means, said casing means including a spherical portion;
a rotatable mass mounted in said casing means to rotate about a spin-axis;
a means for rotating said rotatable mass said rotating means coupled to said rotatable mass;
a frame means for supporting said casing;
said resilient means being an elastomeric ring material in mating relationship with said spherical portion and coupled to said frame, said spherical portion having an axis substantially coincident with said spin-axis, said resilient ring means having an axis substantially coincident with said spin-axis whereby said resilient mounting means surrounds a portion of said casing and is coupled to said frame to enable said frame to support said casing to be free to move about two axes whereby the movement of said casing about said two axes may be detected and employed for control purposes;
said casing having a reflecting surface perpendicular to said spin-axis and including an optical pickoff means for detecting said movement of said surface along two axes, said optical pickoff including detection means for detecting radiant energy reflected from said surface located on a plane substantially parallel with said surface.

2. A control device comprising:
a casing means having a spherical segment exterior surface;
a mass rotatably mounted within said casing for rotation about a spin-axis;
an elastomeric mounting means supporting and mounting said casing, said elastomeric mounting means being an annular member having an interior partially spherical wall matingly engaging the spherical portion of said casing, the exterior wall of said mounting means being affixed to said frame to support said casing to be free to move about two axes, whereby said two axes are detected and employed for control purposes.

3. A two-axis rate gyro comprising:
a casing, said casing having a spherical peripheral portion and a pair of diametrically opposed flat end surfaces;
a mass rotatably mounted within said casing for rotation about a spin-axis, said spin-axis being perpendicular to said flat surfaces;
means for rotating said rotatable mass;
a frame means for supporting said casing; an elastomeric mounting means supporting and mounting said casing, said elastomeric mounting means being an annular member having an interior partially spherical wall matingly engaging the spherical portion of said casing, the exterior wall of said mounting means being affixed to said frame to support said casing to be free to move about two axes, whereby said two axes are detected and employed for control purposes.

4. The structure recited in claim 3, including a transducer means for detecting the movement of said casing about two axes perpendicular to said spin-axis.

5. The structure recited in claim 4, wherein said casing includes a reflecting surface and said transducer means is an optical pickoff including means for impinging radiant energy on said reflecting surface and for receiving the radiant energy reflected from said surface to detect movement about said two axes.

6. The structure recited in claim 5, wherein said reflecting surface on said casing is perpendicular to said spin-axis and said optical pickoff includes detection means parallel to said surface for detecting the received energy from said surface.